Sept. 13, 1932.　　　　J. M. WEYDELL　　　　1,877,101
SYNCHRONIZER
Filed May 6, 1929　　　5 Sheets-Sheet 1

Sept. 13, 1932.  J. M. WEYDELL  1,877,101

SYNCHRONIZER

Filed May 6, 1929  5 Sheets-Sheet 4

Inventor
JARL M. WEYDELL,
By
Attorneys

Sept. 13, 1932.  J. M. WEYDELL  1,877,101
SYNCHRONIZER
Filed May 6, 1929   5 Sheets-Sheet 5

Inventor
JARL M. WEYDELL,

Attorneys

Patented Sept. 13, 1932

1,877,101

UNITED STATES PATENT OFFICE

JARL M. WEYDELL, OF INDIANAPOLIS, INDIANA, ASSIGNOR OF ONE-HALF TO EDWARD E. STOUT

SYNCHRONIZER

Application filed May 6, 1929. Serial No. 360,710.

It is the object of my invention to facilitate the shifting of gears in a change-speed gearing.

In carrying out my invention, I may use an ordinary change-speed gearing in substantially its present form; but provide in addition one or more supplemental gear-trains, each arranged when energized to provide a supplemental connection between two gears or two clutch-members of the change-speed gearing which are regularly meshable with and de-meshable from each other therein. Each such supplemental gear-train includes a clutch as a part thereof, desirably an electro-magnetic clutch, by which it may be rendered effective at the proper times.

The clutch or clutches in the supplemental gear-train or gear-trains may be, and preferably are, controlled in the normal operation of the regular gear-shift lever, and desirably there is a supplemental control by the operation of the regular main-clutch pedal. Such control is operated to render any particular supplemental gear-train effective when the gears or clutch-members which it interconnects are the ones which by a just-initiated movement of the gear-shift lever are about to be intermeshed. Usually such two gears or clutch-members are on or drivingly connected with the driving shaft and the driven shaft respectively of the change-speed gearing; but that driving shaft and its permanently interconnected parts have comparatively small mass, so that it requires little power to produce a change in its speed when it is disconnected both from the driven shaft of the change-speed gearing and from the engine or other power shaft which supplies power to it through a clutch. Thus the power which these supplemental gear-trains are required to transmit is relatively small.

Each gear-train is so proportioned that when energized it brings the two gears or clutch-members which it interconnects and which are about to be intermeshed, to speeds which are nearly (although desirably not quite) equal. In thus referring to equality in speed, I mean peripheral speeds at the pitch lines of the members being considered, which may mean unequal angular speeds if the parts to be intermeshed are on different axes, as in the case of gears, but means equal angular speeds if the parts to be intermeshed are on the same axis, as in the case of jaw-clutch members; in either case meaning that the speeds compared are such that the parts about to be intermeshed may be so intermeshed without clashing.

Ordinarily, I provide the supplemental gear-trains for at least the highest two speeds of the change-speed gearing. That is, in a three-speed-forward gearing, I desirably provide supplemental gear-trains at least for the second-speed and high-speed drives. These two speeds are the ones to which gear shifts are most commonly made while the car is in motion. This is very frequently sufficient; especially as even one supplemental gear-train is sufficient to prevent clashing upon the initial shifting of gears on starting the car either forward or backward, since at that time the driven shaft of the change-speed gearing is at rest, and any one supplemental gear-train is thus sufficient to tend to bring to rest the driving shaft of the change-speed gearing and all the gears normally driven therefrom, so that the initial gear-shift from neutral position may without clashing be made to any gear position. However, supplemental gear-trains may be provided for more than the two gear-positions named, and in a preferred form of my invention illustrated I have shown such supplemental gear-trains for all three of the three forward speeds provided.

The supplemental gear-trains may have various parts in common if desired. Indeed, it is preferable that they should have, for simplicity of construction.

Further, the supplemental gearing mechanism is desirably made in a unit separate from the standard change-speed gearing; so that it may readily be removed therefrom should there be any occasion or desire for such removal, and the regular change-speed gearing be left still fully operative.

The accompanying drawings illustrate my invention.

Figure 1:
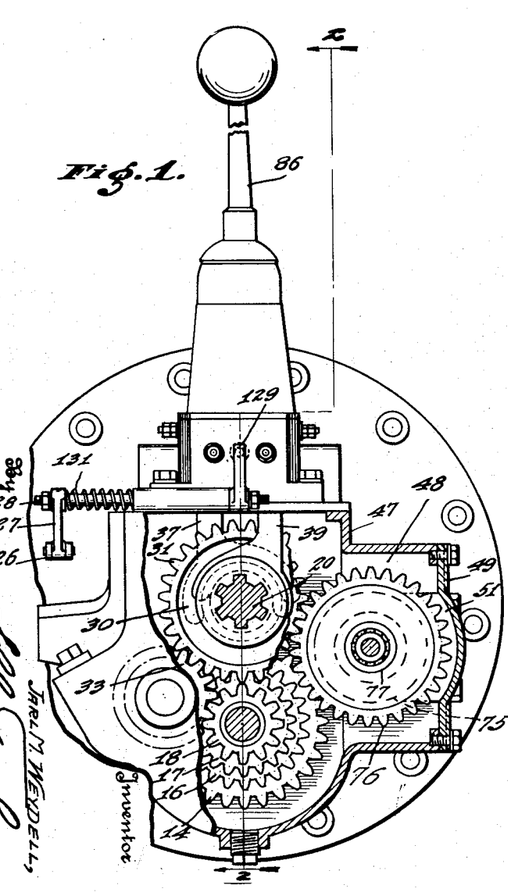
Fig. 1 is a transverse section through a change-speed gearing and synchronizing device embodying my invention in a preferred form, the section being taken substantially on the line 1—1 of Fig. 2.
Figure 2:
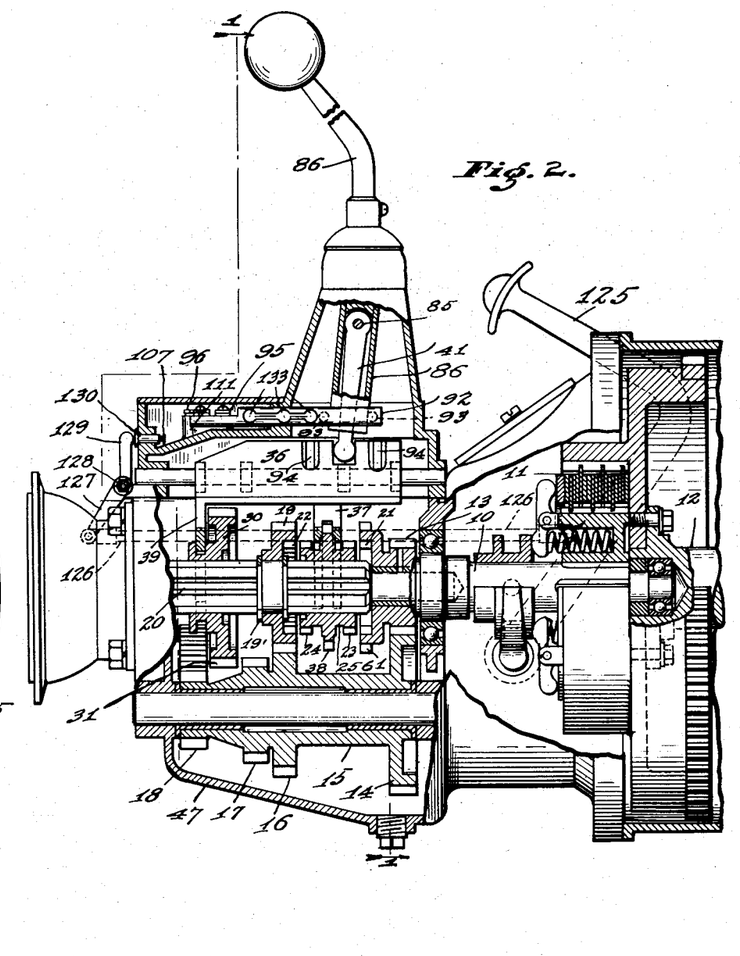
Fig. 2 is a partial longitudinal section and partial elevation of said change-speed gearing, the section being taken substantially on the line 2—2 of Fig. 1.
Figures 3, 4:
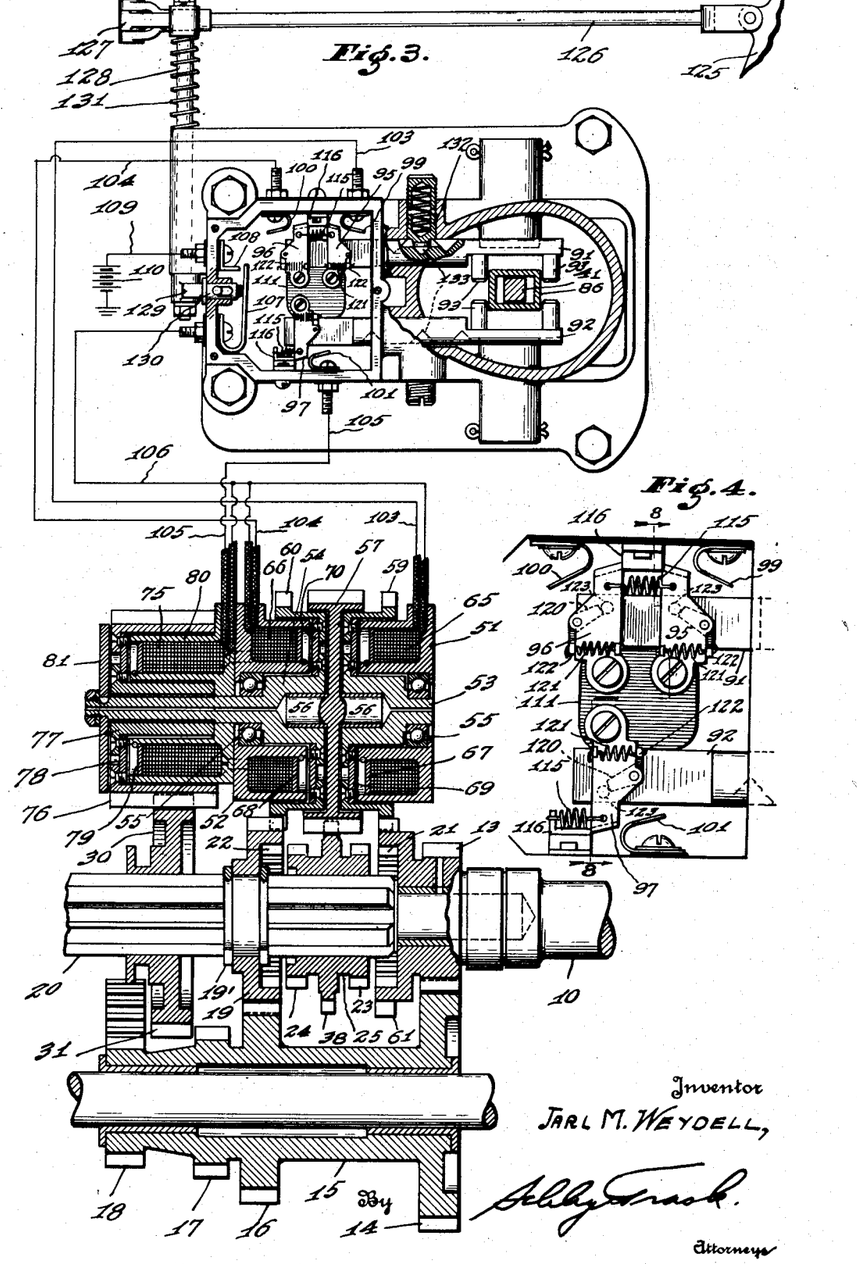
Fig. 3 is a semi-diagrammatic view showing one form of the selective switches, and the electrical connections, with the various gears all shown in the same plane the better to illustrate their interaction, and with the switching mechanism shown generally in partial plan and partial horizontal section.
Fig. 4 is an enlargement, in plan, of the three selective switches of Fig. 3.

The change-speed gearing may in general be of any desired character, with only very slight modifications, for the application of my synchronizing device thereto. Such a change-speed gearing, in almost present standard form, is shown in Figs. 1, 2, and 3.

The driving shaft 10 of the change-speed gearing is connectible through the usual main clutch 11 to the engine shaft of power shaft 12. It is provided with a gear 13 which is in mesh with a gear 14 on a countershaft (or counter-sleeve) 15 of the change-speed gearing. The countershaft or counter-sleeve 15 has other gears 16, 17, and 18 fixed thereon, for second-speed, first-speed, and reverse drives respectively. The countershaft or counter-sleeve 15, with its gears 14, 16, 17, and 18, thus has a fixed speed relationship to the driving shaft 10 of the change-speed gearing. The countershaft gear 16 is in constant mesh with a gear 19; which is rotatably loose on the driven shaft 20 of the change-speed gearing, although suitably held from longitudinal movement thereon as by snap-collars 19'. Such driven shaft 20, as is common in change-speed gearing, is in alinement with the driving shaft 10, and at its forward end may have a pilot bearing in the rear end of such driving shaft.

The gear 13 and the gear 19 have sockets on their faces toward each other, in which sockets are cut the teeth of internal gears 21 and 22; which, however, act not as gears but as clutch members to co-operate with the teeth of external gears 23 and 24 on opposite ends of a slide 25 splined on the driven shaft 20. The four gears 21, 23, 24, and 22 are all co-axial; and the gears 21 and 23 co-operate to form one jaw clutch, for direct clutching of the driving shaft 10 to the driven shaft 20 for the high-speed or third-speed drive, and the gears 22 and 24 co-operate to form another jaw clutch, for clutching the loose gear 19 to the driven shaft 20 for the second-speed drive.

A second slide 30, provided externally with a gear 31, is also splined on the driven shaft 20. It is shown in its middle or idle position in Figs. 2 and 3, and can be shifted in either direction from that middle position; to mesh with the gear 17 to provide the first-speed drive, or with the usual idler gear 32 (Fig. 1) which is in mesh with the gear 18 to provide the reverse drive, when it is shifted to its respective end positions.

The two slides 25 and 30 are shiftable, as is common in change-speed gearings, by two shift rods 35 and 36 respectively. (See Figs. 5 to 7 inclusive.) The shift rod 35 is provided with a yoke 37 which straddles and bears against the two sides of a supplemental gear 38 on the slide 25; the purpose of which supplemental gear 38 will shortly appear. The shift rod 36 is provided with a yoke 39 which is located in a circumferential groove in the slide 30. The two shift rods 35 and 36 are parallel, in the usual manner of such shift rods; and they are provided with notches, shown in the tops of the shift rods, to permit either one of them to be engaged by the lower end of a shifting finger 41, which is operated generally in the usual manner of gear-shift levers of automobile change-speed gearings. This gear-shift finger 41 when in middle or neutral position lies in the notches of both shift rods, which at that time are held against movement by positioning spring-pressed plungers 43 and 44 which prevent the shift rods from being moved. If the gear-shift finger 41 is swung to one side, say to the left in Fig. 6 or upward in Fig. 7, it is freed from the shift rod 36, and pushes the plunger 43 free from the shift rod 35; so that the gear-shift finger may then operate the shift rod 35 freely. On the other hand, if the gear-shift finger is swung in the other direction from its middle position, or to the right in Fig. 6 or downward in Fig. 7, it is freed from the shift rod 35, and pushes the plunger 44 free from the shift rod 36, so that such gear-shift finger may then operate the shift rod 36 freely. If in position to operate the shift rod 35, it may move that shift rod in either direction from its middle position, to produce meshing of the clutch 21—23 for high-speed drive or of the clutch 22—24 for second-speed drive; and if swung to the other side, so that it may operate the shift rod 36, it may move that shift rod in either direction from its middle position, to produce meshing of the gear 31 with the gear 17 for low-speed drive, or with the idler gear 32 for reverse drive. This is the usual and well-understood manner of operation of gear-shift levers and their associated shift rods; and is clear from Figs. 2, 5, 6, and 7.

As so far described, the change-speed gearing is of any ordinary type; the only difference being that the gear-shift finger 41 which has been referred to is differently mounted, with a lost-motion connection to the gear-shift lever 86, in a manner which will be explained later.

The change-speed gearing is mounted in a housing 47, which on one side has an offset recess 48 in which is located my synchronizing mechanism. This synchronizing mechanism is mounted on a removable cap-plate 49, which closes the open outer side of the recess 48. By removing the cap-plate 49, the entire synchronizing mechanism may be taken out, and the change-speed gearing left intact for operation without synchronizing.

The cap-plate 49 carries two supporting members 51 and 52, in which are mounted two rotatable members 53 and 54, suitably carried in ball-bearings 55. The rotatable members 53 and 54 are counter-bored at their adjacent ends to receive trunnions 56 of a gear 57. The two rotatable members 53 and 54 and the trunnions 56 of the gear 57 form a self-alining structure. The gear 57 meshes with the gear 38 on the slide 25. The teeth of one or the other of the gears 38 and 57—as shown, the teeth of the gear 57—are extended axially in order that the gears may remain intermeshed throughout the longitudinal shifting movement of the slide 25.

Co-axial with the shaft 56 and the gear 57 are two loose gears 59 and 60, rotatable relatively to each other and also relatively to the gear 57. The gear 60 meshes with the gear 19; and the gear 59 meshes with a gear 61 integral with the gear 13. Clutches are provided for clutching either gear 59 or 60 to the gear 57. Thus, with such clutches, I have provided two supplemental gear-trains from the driven shaft 20 of the change-speed gearing to the gears 13 and 19 respectively; such gear-trains deriving power in common from the gear 38 and the slide 25, and extending therefrom in common to the gear 57, when the two gear-trains branch through said two clutches to the gears 59 and 60 respectively, and then to the gears 13 and 19 respectively.

The various gear ratios in these supplemental gear-trains are such that when the clutch between the gears 57 and 59 is made active the gear 13 is driven at nearly the same speed (here angular speed) as the driven shaft 20 and gear 23, so that the clutch gears 21 and 23 may be interlocked without clashing; and such that when the clutch between the gears 57 and 60 is made active the gear 19 is driven at nearly the same speed (again angular speed) as the driven shaft 20 and gear 24, so that the clutch-gears 22 and 24 may be interlocked without clashing. Desirably these speed ratios are such that the angular speed of the gears 21 and 23, or of the gears 22 and 24, are not quite identical, as that might prevent interlocking of such gears; to avoid which contingency the gears 59 and 60 are shown slightly smaller than is the gear 57, and the gear 38 slightly smaller than are the gears 19 and 61.

While various kinds of clutches can be used for certain broad features of my invention, I prefer electro-magnetic clutches for locking the gears 59 and 60 to the gear 57; as thereby I obtain a facility of control, in various ways but desirably from the gear-shift lever, without complicated clutch-shifting mechanism.

As shown, the two electro-magnetic clutches have annular stationary coils 65 and 66 respectively located in annular grooves in the adjacent faces of the two stationary members 51 and 52, which latter are made of magnetic material. Thus the annular grooves in the stationary members 51 and 52 are open on the side towards the gear 57 which lies between them. By "open" I mean that such grooves are open so far as magnetic material is concerned; although for holding the coils in place, the annular openings in the magnetic material are closed by rings 67 and 68 of non-magnetic material. This makes each magnet with two concentric poles, an inner pole of one polarity and an outer pole of another polarity, both annular in form and on the side toward the central gear 57. The gear 59 lies between the gear 57 and the magnetizing coil 65; and the gear 60 lies between the gear 57 and the magnetizing coil 66.

The gears 59 and 60 are supported from the rotatable members 53 and 54, respectively, such gears and rotatable members both being of magnetic material; but said gears are spaced from their associated rotatable members by annular gaps spanned by non-magnetic carrying rings 69 and 70 respectively. Such carrying rings are fastened to inwardly extending flanges on the gears 59 and 60 and to outwardly extending flanges on the rotatable members 53 and 54; and the gaps they span are opposite the non-magnetic rings 67 and 68.

When the clutch coil 65 is energized, the magnetic path is from the outer annular portion of the member 51 to the inwardly extending flange of the gear 59, then to the central gear 57, which is also of magnetic material as is common with gears, then to the outwardly extending flange on the rotatable carrying member 53, and then to the inner annular portion of the member 51, thus completing the magnetic circuit. This magnetically interlocks the gears 59 and 57, to produce the clutching effect already referred to.

Similarly, when the clutch coil 66 is energized, the gear 60 is magnetically clutched to the central gear 57, to produce a clutching action as already described.

Figures 9, 10, 11, 12, 13:
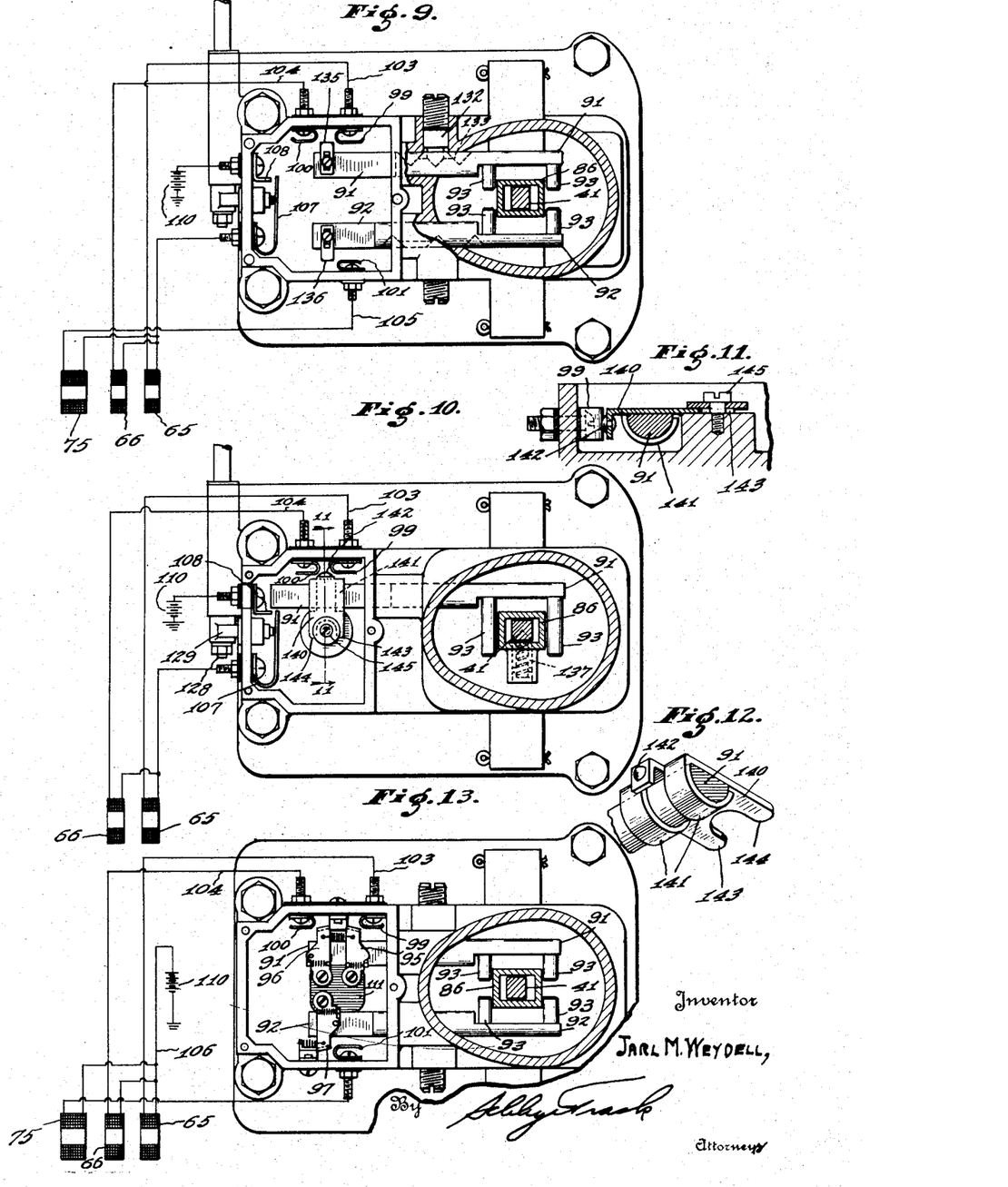
Fig. 9 is a view generally similar to the upper part of Fig. 3, but with the clutch coils shown only diagrammatically, and with a slight different switching mechanism.
Fig. 10 is another view generally similar to Fig. 3, but with still another form of switching mechanism, and with clutch coils (shown diagrammatically) for only the second third forward speeds.
Fig. 11 is an enlarged section substantially on the line 11—11 of Fig. 10.
Fig. 12 is a perspective view of the switch arm of Figs. 10 and 11.
Figs. 13 is another view generally similar to Fig. 3, but with the main-clutch-controlled switch omitted.

The clutch coils 65 and 66 may be the only ones provided, as is indicated diagrammatically in Fig. 10; in which case synchronization is provided only for the second and third forward gear-positions of the change-speed gearing—when the car is in motion—although this also provides for non-clashing synchronization for all gear-positions when the car is at rest. If desired, however, more than two gear-position of the change-speed gearing may be provided with synchronizing mechanism effective even with the car in motion. In the arrangement shown in Figs. 1, 2, 3, and 4, as well as in the arrangements shown diagrammatically in Figs. 9, 13, 14, 15, and 16 there are separate synchronizing coils for all three forward gear-positions. The synchronizing coils for the second and third forward speeds are the coils 66 and 65 already described; and an additional coil 75 is provided for the first forward speed.

If this additional synchronizing coil 75 is provided in the arrangement shown, a loose gear 76 is provided which meshes continuously with the sliding gear 31 of the change-speed gear. This loose gear 76 is coaxial with the gears 57, 59, and 60. The teeth of the gear 76 are of sufficient axial length to permit the necessary sliding of the gear 31 without demeshing it from the gear 76. The gear 76 is supporting by a rotatable member 77, both said gear and said supporting member being of magnetic material; but two are spaced apart by an annular gap spanned by a non-magnetic carrying ring 78 fastened to an inwardly extending flange on the gear and to an outwardly extending flange on said supporting member. Opposite this annular gap is a stationary non-magnetic ring 79 which is similar to the non-magnetic rings 67 and 68 and closes the open end of an annular groove provided in a stationary supporting member 80 rigid with the stationary supporting member 52 and like it made of magnetic material. The third clutch coil 75 is located in such annular groove, and, like the other two magnetizing coils 65 and 66, is stationary.

The action of the magnetizing clutch coil 75 is substantially similar to that of the coils 65 and 66, when such coil is energized. The magnetic path for the coil 75 is from the outer portion of the supporting member 80, to the inwardly extending flange of the gear 76, then to a disk 81 of magnetic material, then to the outwardly extending flange of the rotatable member 77, and thence to the inner annular portion of the supporting member 80, to complete the magnetic circuit. When the clutch coil 75 is energized, therefore, it acts to lock the disk 81 to the gear 76, so that the two rotate together.

The disk 81 is fixed to an extension of the rotatable member 54 which carries the gear 60; whereas the member 77 is rotatably free from such extension so that it may rotate relatively thereto save when the clutch coil 75 is energized.

Thus when the clutch coil 75 is energized, and whether the car is in motion or at rest, power is transmitted from the driven shaft 20 through the gear 31 to the gear 76, thence to the disk 81, thence to the extension of the rotatable member 54 and its carried gear 60, thence to the loose gear 19 with which the gear 60 is in constant mesh, and thence to the gear 16, to bring the counter-sleeve 15 and with it the gear 17 to a speed (zero speed if the car is at rest) proportional to and sufficiently nearly equal to that of the driven shaft 20. As the gear 17 is the one with which the gear 31 is about to be shifted into mesh for first-speed drive, the speed of such gear 17 may thus be brought sufficiently close to that of the gear 31 which is about to be meshed with it to avoid clashing.

The clutch coils 65 and 66, and the clutch coil 75 if it is used, are desirably controlled by switching mechanism associated with the gear-shift lever. This control by the gear-shift lever may be supplemented, and desirably is supplemented, by a switch under the control of the main-clutch pedal, so that such switch will be opened and the various synchronizing clutch coils all de-energized unless such main clutch pedal is depressed.

The switching mechanism may take various forms, of which several are illustrated. In all the forms which I have illustrated, the gear-shift finger 41 is mounted on a transverse pivot pin 85 (Figs. 5 and 6) in the lower end of the gear-shift lever 86, and has a limited forward-and-backward swinging motion with respect to such gear-shift lever. As shown, this limited relative motion is provided by making the lower part of the gear-shift lever 86 hollow, in the form of a tube of rectangular cross-section, in which tube the gear-shift finger 41 has a slight play; as is perhaps most clear from Fig. 5, although it is also apparent from Figs. 3, 9, 10, 13, 14, 15, and 16.

In the form of switching mechanism shown in Figs. 1 to 8 inclusive, there are two slide bars 91 and 92, which lie substantially over and parallel to the shift rods 35 and 36. Each slide bar 91 and 92 at its forward end is provided with a pair of pins 93 which project toward the corresponding pins of the other slide rod when the two slide rods are in their middle position and project in front of and behind the lower end of the lower tubular part of the gear-shift lever 86 when the latter is in its neutral position. As the gear-shift lever 86 is swung to one side or the other, it is swung out of engagement with the pins 93 of one of the slide bars 91 and 92 so that in its forward and backward movement it may operate the other slide rod without affecting the first slide rod. Thus if the gear-shift lever 86 is swung to the side to operate the shift rod 35, it is also swung to the side to operate the slide bar 91; while if it is swung to the side to operate the shift rod 36, it is also swung to the side to operate the slide bar 92. (See Fig. 6.) However, upon the forward or backward movement of the gear-shift lever 86, the slide bar 91 or 92 starts to move longitudinally before the corresponding shift rod 35 or 36 starts to move, by reason of the lost-motion or play already referred to between the gear-shift finger 41 and the gear-shift lever 86 to which such finger is pivoted. This is insured by the action of the plungers 43 and 44, co-operating in the usual manner of such plungers in change-speed gearings with the various positioning notches 94 which are provided in the shift rods 35 and 36.

The slide bars 91 and 92 in the control mechanism shown in Figs. 1 to 8 inclusive, operate certain switch fingers 95, 96, and 97 which control respectively the clutch coils 65, 66, and 75. These switches are normally open, but may be moved into engagement with spring fingers or switch contacts 99, 100, and 101 respectively, by a suitable operation of the slide bars 91 and 92. The spring fingers 99, 100, and 101 are connected by wires 103, 104, and 105 to the clutch coils 65, 66, and 75 respectively; the other terminals of which coils are connected in common to a wire 106 which leads to a switch spring-finger 107; which switch spring-finger is normally held out of engagement with a switch contact 108 connected by a wire 109 to one side of the battery 110, the other side of which battery is grounded. The switch fingers 95, 96, and 97 are also grounded, on the stationary support 111 on which they are pivotally mounted.

The switch fingers 95, 96, and 97 are spring-pressed to open position, by light springs 115, which tend to pull such fingers against stops 116. A single spring 115 and single stop 116 may serve for the two switch fingers 95 and 96, the spring acting between those two fingers to tend to draw them toward each other and against their common stop 116; but the spring 115 for the switch finger 97 acts between such switch finger and the associated stop 116.

Each switch finger 95, 96, and 97 has pivoted thereto an operating pawl 120 (Fig. 4) which is spring-pressed to the position shown by light springs 121 acting between the tails 122 of such pawls and lugs on the respective switch fingers. The tails 122 of the pawls lie against the sides of their respective switch fingers, and limit the relative motion between the pawls and the switch fingers in one direction. Thus they tend to hold the free ends of the pawls in the path of operating pins 123 provided on the slide bars 91 and 92. The slide bar 91 has two such pins 123, for operating the switch fingers 95 and 96, while the slide bar 92 has but one such pin, to operate the switch finger 97.

Figures 5, 8:
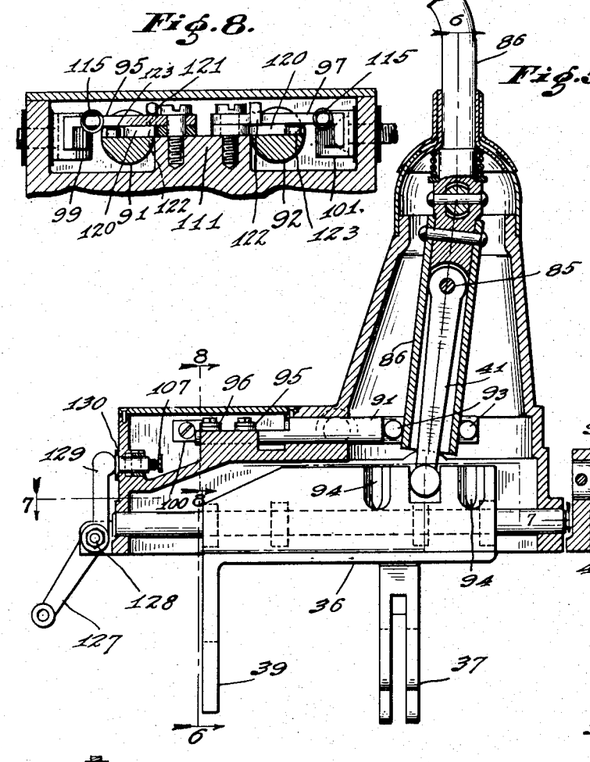
Fig. 5 is an enlargement of part of the mechanism of Fig. 2, and is in general a longitudinal section taken substantially on the lines 5—5 of Figs. 6 and 7.
Fig. 8 is a transverse vertical section on the line 8—8 of Fig. 5.

When the slide bars 91 and 92 are in their middle position, as shown in Figs. 3, 4, and 5, all the switch fingers 95, 96, and 97 are out of engagement with their respective contacts 99, 100, and 101. If the main-clutch pedal 125 is not depressed, the switch 107 is out of engagement with its co-operating contact 108. Under these conditions, of course, the clutch coils 65, 66, and 75 are all de-energized.

The main-clutch pedal 125 is connected by a link 126 to an arm 127 on a rock-shaft 128 which has another arm 129 which acts on a plunger 130; so that such plunger is forced inward against the switch spring-finger 107 to separate the latter from the switch contact 108 unless the main clutch pedal 125 is depressed. The plunger 130 has at least its point of insulating material, where it engages the switch spring-finger 107, in order that such switch spring-finger may not be grounded; which insulating point may be formed of a rod of insulating material inserted in a shorter bore in the plunger end. The force for so pushing in the plunger 130 is provided by the usual clutch-setting spring. The coil spring 131 shown on the rock shaft 128 is merely an expansion spring to prevent rattling.

Figure 6:
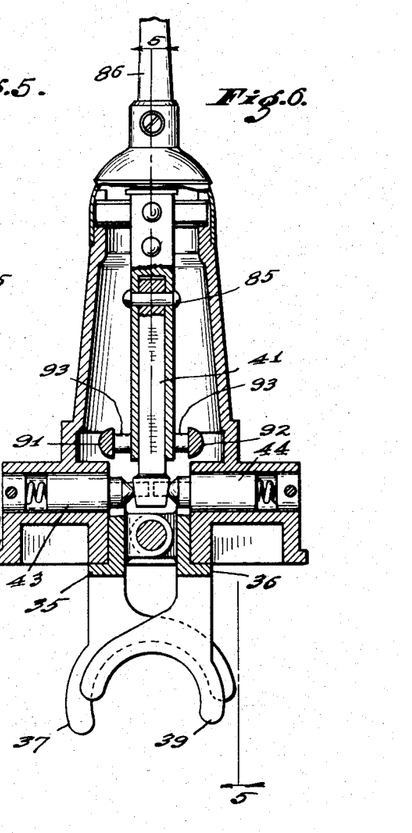
Fig. 6 is a vertical transverse section taken substantially on the line 6—6 of Fig. 5.
Figure 7:
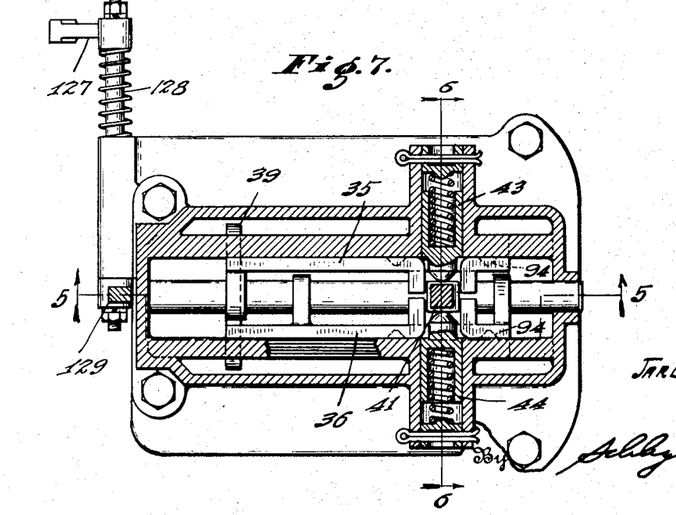
Fig. 7 is a horizontal section substantially on the line 7—7 of Fig. 5.

Assume that the gear shift lever 86 is in neutral position, and that the main-clutch pedal 25 is not depressed. This is the position in which the parts are shown in Figs. 1 to 8 inclusive. If it is now desired to shift gears, say to first speed forward, the main-clutch pedal 125 is depressed to release the main clutch. This also acts to rock the rock-shaft 128, counter-clockwise in Fig. 5, so that the pressure of the arm 129 on the plunger 130 is released, and so that in consequence the switch spring-finger 107 may engage the contact 108 to close the circuit from one side of the battery 110 to the several clutch coils 65, 66, and 75, although the circuits of such coils are still open at the respective contacts 99, 100, and 101. The gear-shift lever 86 is now swung from neutral position to one side or the other. If the handle of the gear-shift lever is swung to the left, considered as in normal driving position and as shown in Figs. 1 and 6, the lower end of the gear-shift lever and the gear-shift finger 41 are swung to the right, to disengage them from the slide bar 91 and shift rod 35 and to put them in position to operate the slide bar 92 and shift rod 36. If now the handle of the gear-shift lever is swung backward, the lower end of the gear-shift lever is swung forward. At first this moves only the slide bar 92; which through its associated pin 123 acts on the pawl 120 of the switch finger 97 to shift the free end of that switch finger 97 (to the right in Figs. 3 and 4) forward into engagement with the contact 101. This completes the circuit for the clutch coil 75, which circuit is from the battery 110, through the wire 109, contact 108, spring-finger 107, wire 106, coil 75, wire 105, contact 101, switch finger 97, grounded support 111, and thus back to the grounded side of the battery 110. By reason of the energization of the coil 75, the disk 81 is locked to the gear 76, to provide the supplemental gear train between the gear 31 and the gear 17 with which it is about to be intermeshed; and this supplemental gear train acts to bring the gear 17 close to the peripheral speed (on the pitch line) of the gear 31, whether the gear 31 is at rest or in motion. This energization of the clutch coil 75 occurs before the lost-motion between the gear-shift lever 86 and the gear-shift finger 41 is taken up. After that lost-motion is taken up, by the engagement of the rear portion of the hollow lower end of the gear-shift lever 86 with the rear side of the gear-shift finger 41, (which as already stated is not until after the energization of the clutch coil 75 has been effected,) further movement of the gear-shift lever 86 acts through such gear-shift finger 41 to move the shift rod 36 forward; which causes the shifting-yoke 39 to shift the slide 30 forward (to the right in Figs. 1 and 3) to produce intermeshing of the gear 31 with the gear 17 for first speed forward.

As the gear 31 slides into mesh with the gear 17, the swinging of the switch finger 97 reaches such a point that the pawl 120 (Fig. 4) is moved out of engagement with the pin 123 on the slide bar 92. Thereupon the spring 115 associated with that switch finger 97 swings such switch finger out of engagement with the contact 101 and back against the stop 116. This breaks the circuit for the clutch coil 75, and renders the supplemental gear train above referred to ineffective and only the main drive between the gears 17 and 31 effective.

The main-clutch pedal 125 is now allowed to rise in the usual manner, to throw in the main clutch and open the switch 107—108.

Upon now shifting from first gear to second gear, the gear-shift lever is first swung forward and then to the right through neutral position, and then farther forward; as is commonly understood by automobile drivers. This moves the lower end of the gear-shift lever, and also the gear-shift finger 41, first backward, then to the left through neutral, and then farther backward. In spite of the lost-motion between the gear-shift finger 41 and the gear-shift lever 86, the two pass sidewise through neutral position simultaneously, by reason of the positioning action of the plungers 43 and 44 on the shift rods 35 and 36 and of a corresponding positioning action of similar but lighter plungers 132 on positioning notches 133 provided in the slide bars 91 and 92.

In the first part of this shifting movement from the first speed to second speed, the lower end of the gear-shift lever 86 moves the slide bar 92 backward to neutral position. This is done without affecting the switch finger 97, for the pawl 120 of such spring finger simply swings out of the way (clockwise in Fig. 4) against the action of its spring 121 and snaps back in front of such pin as the pin 123 passes backward to neutral position. Thus this first part of the shifting movement of the gear-shift lever produces no action on the clutch coils.

In the sidewise movement of the handle of the gear-shift lever 86 through neutral, from left to right, the resultant movement of the lower part of the gear-shift lever and the gear-shift finger 41 to the left through neutral disengages them from the slide bar 92 and shift rod 36, and interengages them with the slide bar 91 and shift rod 35. This also does not affect the clutch coils.

As the handle of the gear-shift lever 86 is now swung forward for the third and final part of its movement from first-speed to second-speed position, the lower end of such gear-shift lever is swung backward; but at first this does not move the gear-shift finger 41 because of the lost-motion already referred to. However, the start of the backward movement of the lower end of the gear-shift lever 86 at once moves the slide bar 91 backward (or to the left in Figs. 3 and 4) so that the pin 123 below the switch finger 96 acts on the associated pawl 120 to move such switch finger 96 into engagement with the contact or spring finger 100. As of course during the shifting movement of the gear-shift lever the main-clutch pedal 125 is depressed, to permit the switch spring-finger 107 to engage the switch contact 108, this movement of the switch finger 96 closes the circuit for the clutch coil 66; the circuit being from the battery 110, through the wire 109, contact 108, switch finger 107, wire 106, clutch coil 66, wire 104, switch contact 100, switch finger 96, grounded support 111, and thence back to the grounded side of the battery 110. The energization of the clutch coil 66 interlocks the gears 60 and 57, so that they rotate together; and this acts to complete the supplemental gear train from the driven shaft 20 of the change-speed gearing through the gear 38, gear 57, and gear 60, to the gear 19 and its associated internal gear 22; to bring the latter gear, which is in effect a jaw-clutch gear, to very close to the same speed as the associated jaw-clutch gear 24 with which it is about to be intermeshed. Following the energization of the clutch coil 66, and the slightly subsequent taking up of the lost-motion between the gear-shift lever 86 and the gear-shift finger 41, a continued forward movement of the handle of the gear-shift lever 86 in the last part of its movement to second-speed position moves the gear-shift finger 41 backward and with it moves the shift rod 35 and yoke 37 to shift the slide 25 backward to intermesh the jaw-clutch gear 24 with the internal jaw-clutch gear 22; which latter has been brought substantially to synchronization with the gear 24 and driven shaft 20 by the action of the supplemental gear train which was rendered effective by the clutch coil 66. As the gears 22 and 24 move into mesh, to provide the second-gear drive, the pawl 120 of the switch finger 96 swings clear of its associated pin 123 and permits the spring 115 to return such switch finger to its normal position against the stop 116 and out of engagement with the contact 100, thus breaking the circuit for the clutch coil 66.

When now the gear-shift lever 86 is moved backward from second-speed position to third-speed position, it moves the lower end of such gear-shift lever and also moves the gear-shift lever 41 forward. This correspondingly moves forward the slide bar 91 and the shift rod 35, with the slide bar 91 leading because of the lost-motion of the gear-shift finger 41. As the slide bar 91 moves forward, it carries its associated pins 123 forward also. The first part of such movement merely swings the pin 123 which lies below the switch finger 96 past the associated pawl 120 into a position in advance of such pawl, the pawl yielding as the pin passes. The second half of the forward movement of the slide bar 91 causes the other pin 123—the one below the switch finger 95—to push that switch finger forward by reason of the co-operation of that pin with the pawl 120 of such switch finger. This moves the switch finger 95 into engagement with the contact 99, to complete the circuit for the clutch coil 65; which is similar to the circuits already traced and thus needs no separate tracing. The resultant energization of the clutch coil 65 interlocks the gears 57 and 59, and thus completes the supplemental gear train between the gears 23 and 21 which are about to be intermeshed for third-speed drive, such supplemental gear train being from the gear 38 through the gear 57, to the gear 59 interlocked to the gear 57, and then to the gear 61 which is integral with the gear 21. This acts to bring the gear 21, which is on the driving shaft 10 of the change-speed gearing but is disconnected from the engine by reason of having the main-clutch pedal 125 depressed in the usual manner during this gear-shifting operation, into substantial synchronization with the gear 23. The backward movement of the handle of the gear-shift lever 86 also moves the shift rod 35 forward, with a lag behind the slide rod 91 as already stated, and this first disconnects the gears 22 and 24, and then interconnects the gears 21 and 23 for third-speed or direct drive; and does the latter without clashing because of the synchronizing action above described.

In the same general way, gear shifts from third-speed to second-speed, or from either third-speed or second-speed to first-speed may be obtained as desired with effective synchronization. As the shift is made to any of these positions, the corresponding clutch coil is energized to complete the proper supplemental gear train before the main driving connection is made effective for that position; so that the shift may be made without clashing.

Of course, during any of these gear-shifting operations the main-clutch pedal 125 is depressed, both so that the switch 107—108 may be closed and that the shaft 10 may be disconnected from the engine shaft 12; and upon the completion of the gear-shifting operation the clutch pedal is allowed to rise to open that switch and throw the main clutch in again. This switch 107—108 is desirable to make sure that the circuits for the clutch coils are open and remain open save when the main clutch-pedal 125 is depressed; so that if the driver merely rests his hand on the handle of the gear-shift lever 86 and inadvertently moves it slightly but sufficient to close one of the switches 95, 96, or 97, there will be no energization of any clutch coil. If such inadvertent movement occurs, when the driver releases his hand the positioning plungers 132 return the slide bars 91 or 92 to their middle positions if they have been moved therefrom, and the springs 115 will open any switches 95, 96, or 97 which may have been closed by such inadvertent operation.

However, while I deem the main-clutch-controlled switch 107—108 desirable, and I show it in most of the illustrated arrangements embodying my invention, it is not essential in the broader aspects of my invention. I have illustrated this in Fig. 13, which is substantially the same as Fig. 3 save for the omission of such switch 107—108. If such switch is omitted, the wire 109 is likewise omitted, and the wire 106 is connected directly to the battery 110.

In the arrangement shown in Fig. 9, the switching arrangement is the same as has already been described, save for the switches which co-operate with the contacts 99, 100, and 101. Instead of having swinging switch fingers 95, 96, and 97, I mount on the slide bars 91 and 92 switch fingers 135 and 136, one on each slide bar. Such switch fingers are normally rigid with the slide bars on which they are mounted, but may be transversely adjustable thereon as indicated. When the slide bar 92 is moved forward, it moves its associated switch finger 136 into engagement with the contact 101; which engagement is maintained so long as the slide bar 92 remains in its forward position. However, the circuit for the associated clutch coil 75 is not maintained complete throughout that time, because such circuit is broken at the switch 107—108 as soon as the main-clutch pedal 125 is permitted to rise. In the same way, when the slide bar 91 is moved forward or back, it moves the switch finger 135 into engagement with the contacts 99 and 100 respectively, and such engagement is maintained until the slide bar 91 is moved out of such forward or backward position; but the circuits for the respectively associated clutch coils 65 and 66 are not maintained meanwhile, for they are broken at the switch 107—108 as soon as the main clutch pedal 125 is allowed to rise.

In the arrangement so far described, the energization of the clutch coils does not occur until the gear-shift lever 86 and the slide bars 91 and 92 have passed the middles of their various shifting movements from one speed-position to another. It may be desired, however, to produce such energization before the gear-shift lever and slide rod reach the middles of their movements.

Such an arrangement is shown in Figs. 10, 11, and 12; but is shown there only for the slide rod 91, and the slide 92 and the clutch coil 75 may be omitted. That is, for illustration purposes I have shown this form of my invention in connection with only two clutch coils, 65 and 66, for second-speed and third-speed drives.

With this arrangement, the pins 93 of the slide bar 91 are made desirably longer than in the other cases, so that the lower end of the gear-shift lever 86 is never disconnected therefrom regardless of whether it is swung to one side or the other. In addition, a spring-pressed centering plug 137 is provided between the gear-shift lever 86 and the gear-shift finger 41, and none is provided between the slide bar 91 and the stationary parts carrying such slide bar.

As a result, when a gear-shifting movement has been completed, and the operator releases the handle of the gear-shift lever 86, the latter and with it the bar 91 is moved by the centering plunger slightly in the other direction from that in which it was hand-moved.

A slide 140 is mounted on the slide bar 91. This slide has two fingers 141 which pass around the under side of the slide bar 91 and serve as spring fingers to grip the slide 140 on such slide bar while permitting it to slide longitudinally thereon under pressure. At one end the slide 140 carries a switch button or switch finger 142, which normally lies between the two spring-contacts 99 and 100 but may be moved into engagement with one or the other of them by a longitudinal movement of the slide bar 91. At the other end the slide 140 has two fingers 143 and 144, which lie on opposite sides of a stop-screw 145 but with sufficient play to permit the switch button 142 to be moved into engagement with either contact 99 or 100 before either finger 143 or 144 engages the stop-screw to stop further movement of the slide 140. When such engagement of a finger and the pin occurs, such further movement of the slide is stopped; but the slide bar 91 may continue on its movement by sliding through the slide 140; since the latter is merely spring-held thereon. When the operator releases the handle of the gear-shift lever 86, however, with the gears in neutral or in any meshed position, the plungers 43 and 44 hold the shift rod 35 or 36 and through it the gear-shift finger 41 against unintended return movement, but the centering plunger 137 by its action between such gear-shift finger 41 and the gear-shift lever 86 acts to return the latter and with it the slide bar 91 slightly in the reverse direction from that in which they were hand-moved; and this in turn acts to move the slide 140 back to its middle position with respect to the contacts 99 and 100 and the stop-screw 145 and thus breaks any clutch-coil circuit which may have been closed.

In consequence, when a gear-shift is made to either second-speed position or third-speed position, whether from neutral or from any other gear position than that to which the shift is being made, the first part of the movement of the gear-shift lever produces a closing of the proper clutch coil 65 or 66, without waiting for the middle of the movement to be reached; and maintains such circuit complete until the operator releases the handle of the gear-shift lever, whereupon such circuit is broken.

In this arrangement, I prefer to use the switch 107—108 which is operated by the main-clutch pedal 125 as before.

Figure 14:
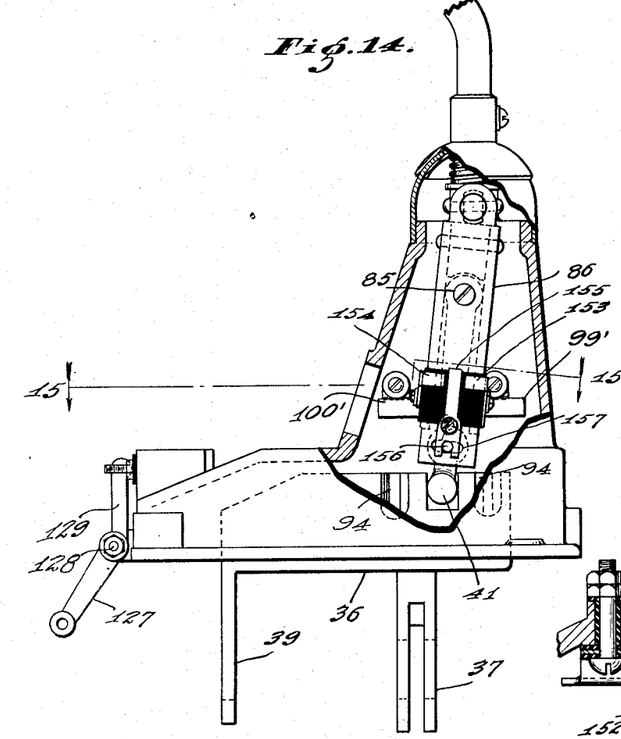
Fig. 14 is a view generally similar to Fig. 5, but with the switching mechanism carried by the gear-shift lever.
Figure 15:
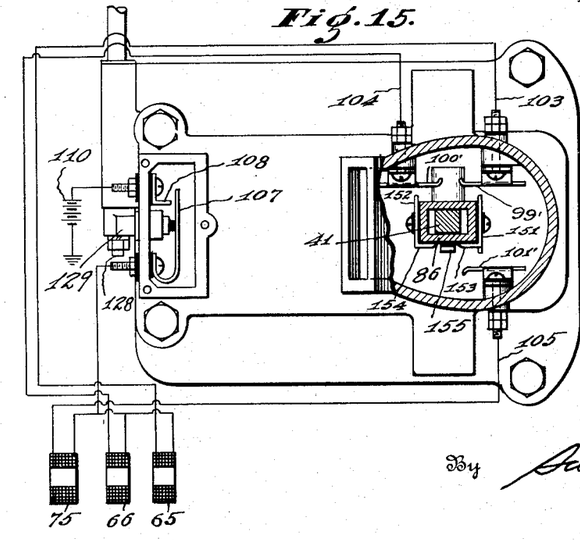
Fig. 15 is a section on the line 15—15 of Fig. 14.
Figure 16:
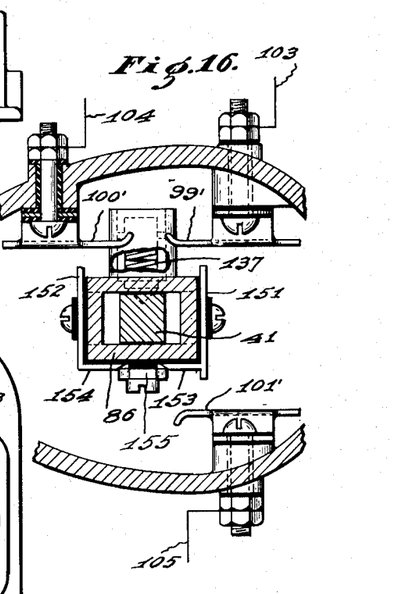
Fig. 16 is an enlargement of the right-hand portion of Fig. 15.

In the arrangement shown in Figs. 14, 15, and 16, I mount directly on the lower end of the gear-shift lever a part of the switching mechanism that is controlled thereby. Thus instead of providing slide rods 91 and 92 for operating the switches, I may do away entirely with such slide rods.

In this arrangement, I provide three switch contacts 99', 100', and 101', which correspond generally with the contacts 99, 100, and 101 already described so far as their connections are concerned. On the lower end of the gear-shift lever 86 I mount, with suitable insulation, two contact fingers 151 and 152, which project sidewise beyond the surface of the gear-shift lever 86 as is most clear from Fig. 16. The contact finger 151 projects in both directions sidewise beyond such gear-shift lever, while the contact finger 152 projects only in one direction sidewise beyond such gear-shift lever. When the gear-shift lever is in neutral position, the contact fingers 151 and 152 are out of engagement with all three contacts 99', 100', and 101'. When the handle of the gear-shift lever is swung to one side, say to the left with respect to the operator, the lower end of the gear-shift lever is swung to the right (or downward in Figs. 15 and 16) to produce engagement of the contact finger 151 with the contact 101'; and such engagement is maintained as the lower end of the gear-shift lever is swung forward (to the right in Fig. 16) toward first-speed position, though not necessarily as it is swung backward toward reverse-drive position. When the handle of the gear-shift lever is swung to the other side, the right with respect to the operator, the lower end of the gear-shift lever is swung to the left (or upward in Figs. 15 and 16) to produce engagement of the contact fingers 151 and 152 with the contacts 99' and 100' respectively; and such engagement is maintained between the contacts 99' and 151 at least as the lower end of the gear-shift lever 86 is swung forward (to the right in Fig. 16) and between the contacts 100' and 152 at least as the lower end of the gear-shift lever 86 is swung backward (to the left in Fig. 16), although it is not necessarily maintained and desirably is not maintained as the gear-shift lever is swung in the respective opposite directions.

The contacts 151 and 152 have bent portions 153 and 154 which lie on one side of the lower end of the gear-shift lever 86. These form stationary contacts of a double-throw switch, the movable contact of which is a swinging switch finger 155 pivoted on and in electrical contact with the lower end of such gear-shift lever. The lower end of the switch finger 155 is bifurcated, to straddle a pin 156 carried by the gear-shift finger 41 and projecting through a slot 157 in the side of the gear-shift lever 86 near its lower end.

Thus upon relative movement between the gear-shift lever and the gear-shift finger, the pin 156 moves in the slot 157, and swings the switch finger 155 into contact with one or the other of the two switch contacts 153 and 154.

This acts to produce an effective control of the various clutch coils. When the handle of the gear-shift lever 86 is swung to to the left, so that its lower end is swung to the right (downward in Fig. 16), the contact finger 151 engages the contact 101'; and when the handle of the gear-shift lever 86 is now swung rearward toward first-speed position, and in consequence the lower end of said gear-shift lever is swung forward, the action of taking up the lost-motion between said gear-shift lever and the gear-shift finger 41 swings the switch finger 155 forward into engagement with the contact 153. This completes the circuit for the first-speed synchronizing clutch-coil 75, by way of the wire 105 as before; and as the movement of the gear-shift lever 86 continues, the gears 31 and 17 are intermeshed for first-speed drive. Of course, the main clutch pedal 125 is held depressed during such shifting; and must be so held depressed to produce such synchronizing tendency if the switch 107—108 is provided as shown in Fig. 15. When the first-speed position is reached, and the operator releases the handle of the gear-shift lever, the centering plunger 137 between the gear-shift lever and the gear-shift finger acts as already described in connection with Fig. 10 to re-center the gear-shift lever 86 on the gear-shift finger 41; to open the circuit of the clutch coil which has been energized, by returning the switch finger 155 to its middle position.

Similarly, when the handle of the gear-shift lever 86 is swung to the right, so that its lower end is swung to the left (upward in Fig. 16), the contact fingers 151 and 152 engage the contacts 99' and 100' respectively; and when the handle of the gear-shift lever 86 is now swung forward or backward, toward second-speed position or third-speed position, and in consequence the lower end of said gear-shift lever is swung backward or forward respectively (left or right respectively in Fig. 16), the taking up of the lost-motion between said gear-shift lever and the gear-shift finger 41 swings the switch finger 155 backward or forward into engagement with the contact 154 or 153 respectively. This completes the circuit for the second-speed or third-speed synchronizing clutch coil 66 or 65 respectively, by way of the wire 104 or 103 as before; and as the movement of the gear-shift lever 86 continues, the slide 25 is moved backward or forward to engage the gears 22 and 24 or the gears 21 and 23 for second-speed and third-speed drives respectively. As before, the main-clutch pedal 125 is operated in the usual manner. When the second-speed or third-speed position is reached, and the operator releases the handle of the gear-shift lever, the centering plunger 137 between the gear-shift lever and the gear-shift finger acts to re-center the gear-shift lever on the gear-shift finger as has already been described.

I claim as my invention:

1. In a change-speed gearing, the combination of a driving shaft, a driven shaft, a plurality of alternative drive connections of different speed-ratios between said driving shaft and said driven shaft, said alternative drive connections including relatively shiftable parts by which they are respectively rendered operative, a gear-shifting mechanism controlling the shifting of said relatively shiftable parts, a supplemental synchronizing drive-train between certain of said relatively shiftable parts, said supplemental synchronizing drive-train including a normally inoperative electro-magnetic clutch, and switching means operated by a preliminary movement of said gear-shifting mechanism for controlling said clutch.

2. In a change-speed gearing, the combination of a driving shaft, a driven shaft, a plurality of alternative drive connections of different speed-ratios between said driving shaft and said driven shaft, said alternative drive connections including relatively shiftable parts by which they are respectively rendered operative, a gear-shifting mechanism controlling the shifting of said relatively shiftable parts, a supplemental synchronizing drive-train between certain of said relatively shiftable parts, said supplemental synchronizing drive train including a normally inoperative electro-magnetic clutch, said gear-shifting mechanism including two parts having a lost-motion connection between them, and switching means operated by differential movement between said two parts for controlling said clutch.

3. In a change-speed gearing, the combination of a casing, a driving shaft and an alined driven shaft rotatably mounted in said casing, means for connecting said two shafts alternatively in different speed ratios, said means including a set of gears located at one side of the two shafts first named, a synchronizing mechanism located at another side of said two alined shafts and containing one or more clutching mechanisms for producing a preliminary tendency toward synchronization of parts about to be interconnected in said alternative connecting means, and a support which is secured to said casing and on which said synchronizing mechanism is mounted, said synchronizing mechanism and said support being removable without interfering with the operativeness of said first-named interconnecting means.

4. In a change-speed gearing, the combination of a casing, a driving shaft and an alined driven shaft rotatably mounted in said casing, means for connecting said two shafts alternatively in different speed ratios, a synchronizing mechanism located at one side of said two alined shafts and of which said main shaft-interconnecting means is independent, said synchronizing mechanism containing one or more clutching mechanisms for producing a preliminary tendency towards synchronization of parts about to be interconnected in said alternative connecting means, and a support which is secured to said casing and on which said synchronizing mechanism is mounted, said synchronizing mechanism and said support being removabel without interfering with the operativeness of said first-named interconnecting means.

5. In a change-speed gearing, the combination of a driving shaft, and an alined driven shaft, means for connecting said two shafts alternatively in different speed ratios, said means including a set of gears located at one side of the two shafts first named, and a synchronizing mechanism located at another side of said two alined shafts and containing one or more electro-magnetic clutching mechanisms for producing a preliminary tendency toward swnchronization of parts about to be interconnected in said alternative connecting means.

6. In a change-speed gearing, the combination of a driving shaft, and an alined driven shaft, means for connecting said two shafts alternatively in different speed ratios, and a synchronizing mechanism located at one side of said two alined shafts and of which said main shaft-interconnecting means is independent, said synchronizing mechanism containing one or more electro-magnetic clutching mechanisms for producing a preliminary tendency towards synchronization of parts about to be interconnected in said alternative connecting means.

7. In combination, two relatively rotatable members provided respectively with interengageable teeth, said two members being relatively movable to cause engagement and disengagement of said teeth, synchronizing means associated with said two members and including a clutch which, when engaged, tends to cause synchronism of said two members, a source of energy, and control means for connecting said source of energy to said clutch to cause its engagement.

8. In combination, two relatively rotatable members provided respectively with interengageable teeth, said two members being relatively movable to cause engagement and disengagement of said teeth, provisions for so moving said members, synchronizing means associated with said two members and including a clutch which, when engaged, tends to cause synchronism of said two members, a source of energy, and control means for connecting said source of energy to said clutch to cause its engagement, said provisions and said control means being jointly operable to tend to cause synchronism of said two rotating members prior to their interengagement.

9. In a change-speed gearing, the combination of a driving shaft, a driven shaft, a plurality of alternative drive connection of different speed-ratios between said driving shaft and said driven shaft, said alternative drive connections including relatively shiftable parts by which they are respectively rendered operative, a gear-shifting mechanism controlling the shifting of said relatively shiftable parts, a supplemental synchronizing drive-train between certain of said relatively shiftable parts, said supplemental synchronizing drive-train including a normally inoperative electro-magnetic clutch, and gear-shifting mechanism including an operating handle which has a limited relative movement on the gear-shifting mechanism proper to provide lost-motion which is taken up before a movement of the handle produces any shifting of said shiftable parts, and switching means operated by said operating handle for controlling said clutch.

In witness whereof, I have hereunto set my hand at Indianapolis, Indiana, this 4th day of May, A. D. one thousand nine hundred and twenty nine.

JARL M. WEYDELL.